(12) United States Patent
Kang

(10) Patent No.: US 11,728,530 B2
(45) Date of Patent: Aug. 15, 2023

(54) LITHIUM SECONDARY BATTERY AND SECONDARY BATTERY SUB MODULE COMPRISING THE SAME

(71) Applicant: SK ON CO., LTD., Seoul (KR)

(72) Inventor: Hee-Gyoung Kang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 16/889,841

(22) Filed: Jun. 2, 2020

(65) Prior Publication Data
US 2020/0295312 A1 Sep. 17, 2020

Related U.S. Application Data

(63) Continuation of application No. 15/171,204, filed on Jun. 2, 2016, now abandoned.

(30) Foreign Application Priority Data

Jun. 3, 2015 (KR) .......................... 10-2015-0078723

(51) Int. Cl.
*H01M 10/613* (2014.01)
*H01M 10/6551* (2014.01)
(Continued)

(52) U.S. Cl.
CPC ....... *H01M 10/613* (2015.04); *H01M 10/052* (2013.01); *H01M 10/625* (2015.04);
(Continued)

(58) Field of Classification Search
CPC ............. H01M 10/052; H01M 10/613; H01M 10/625; H01M 10/6551; H01M 10/6555;
(Continued)

(56) References Cited

U.S. PATENT DOCUMENTS 5,175,238 A * 12/1992 Matlack .................. C08L 77/00
528/340
5,227,260 A 7/1993 Rose et al.
(Continued)

FOREIGN PATENT DOCUMENTS

CN    1254199 A    5/2000
CN    2388712 Y    7/2000
(Continued)

OTHER PUBLICATIONS

Machine translation of JP 2002-260736 (Year: 2002).*

*Primary Examiner* — Miriam Stagg
*Assistant Examiner* — Rachel L Zhang
(74) *Attorney, Agent, or Firm* — The Webb Law Firm

(57) ABSTRACT

The present invention provides a lithium secondary battery and a lithium secondary battery sub module including the same. The lithium secondary battery includes: an electrode assembly; a plastic case which houses the electrode assembly and includes a gas barrier layer; and a pouch film cover which seals the plastic case having the electrode assembly housed therein, such that it is possible to achieve a battery having a significantly increased thickness so as to increase the capacity thereof without structural limitation, secure durability of the battery due to having excellent resistance to permeability, and improve productivity due to a decrease in an occurrence of poor insulation. Thereby, the lithium secondary battery sub module including the lithium secondary battery may have a high energy density and may be formed in a compact shape with reduced manufacturing costs.

5 Claims, 3 Drawing Sheets

(51) Int. Cl.
*H01M 10/625* (2014.01)
*H01M 10/052* (2010.01)
*H01M 10/6555* (2014.01)
*H01M 50/124* (2021.01)
*H01M 50/147* (2021.01)
*H01M 50/211* (2021.01)
*H01M 50/129* (2021.01)
*H01M 50/122* (2021.01)
*H01M 50/119* (2021.01)
*H01M 50/121* (2021.01)
*H01M 50/117* (2021.01)

(52) U.S. Cl.
CPC ... *H01M 10/6551* (2015.04); *H01M 10/6555* (2015.04); *H01M 50/117* (2021.01); *H01M 50/119* (2021.01); *H01M 50/121* (2021.01); *H01M 50/122* (2021.01); *H01M 50/124* (2021.01); *H01M 50/129* (2021.01); *H01M 50/147* (2021.01); *H01M 50/211* (2021.01); *H01M 2220/20* (2013.01); *Y02E 60/10* (2013.01); *Y02P 70/50* (2015.11); *Y02T 10/70* (2013.01)

(58) Field of Classification Search
CPC .......... H01M 2220/20; H01M 50/116; H01M 50/124; H01M 50/147; Y02E 60/10
See application file for complete search history.

(56) References Cited

U.S. PATENT DOCUMENTS

| | | | |
|---|---|---|---|
| 6,399,241 B1 | 6/2002 | Hara et al. | |
| 10,079,373 B2 | 9/2018 | Kim et al. | |
| 2003/0031923 A1 | 2/2003 | Aoshima et al. | |
| 2004/0253463 A1 | 12/2004 | Inui et al. | |
| 2007/0077485 A1 | 4/2007 | Takamura et al. | |
| 2011/0027630 A1* | 2/2011 | Tsutsumi | H01M 50/10 429/53 |
| 2011/0045251 A1* | 2/2011 | Kazeto | C08J 7/0427 428/174 |
| 2011/0059367 A1 | 3/2011 | Morita et al. | |
| 2012/0009455 A1 | 1/2012 | Yoon | |
| 2012/0028105 A1 | 2/2012 | Kumar et al. | |
| 2012/0052365 A1 | 3/2012 | Chang | |
| 2013/0266837 A1 | 10/2013 | Lee et al. | |
| 2014/0045032 A1* | 2/2014 | Tanaka | H01M 10/0563 429/144 |
| 2014/0113171 A1* | 4/2014 | Schaefer | H01M 10/625 165/185 |
| 2016/0237237 A1 | 8/2016 | Tour et al. | |

FOREIGN PATENT DOCUMENTS

| | | |
|---|---|---|
| CN | 1291802 A | 4/2001 |
| CN | 1617797 A | 5/2005 |
| CN | 101033355 A | 9/2007 |
| CN | 103081162 A | 5/2013 |
| CN | 104183863 A | 12/2014 |
| JP | 2001196036 A | 7/2001 |
| JP | 2002260736 A | 9/2002 |
| KR | 20020078364 A | 10/2002 |
| KR | 1020120085540 A | 8/2012 |
| KR | 1020130089614 A | 8/2013 |
| KR | 1020130112605 A | 10/2013 |
| KR | 1020140136831 A | 12/2014 |
| WO | 2005117162 A1 | 12/2005 |

* cited by examiner

PRIOR ART

LITHIUM SECONDARY BATTERY AND SECONDARY BATTERY SUB MODULE COMPRISING THE SAME

CROSS-REFERENCE TO RELATED APPLICATION

This application is a continuation of U.S. patent application Ser. No. 15/171,204, filed on Jun. 2, 2016, which claims priority to Korean Patent Application No. 10-2015-0078723 filed Jun. 3, 2015, the disclosures of each of which are hereby incorporated by reference in their entireties.

BACKGROUND OF THE INVENTION

1. Field of the Invention

The present invention relates to a lithium secondary battery and a secondary battery sub module including the same.

2. Description of the Related Art

Recently, a lithium secondary battery, which is rechargeable and lightweight and has high energy and power densities, has been widely used as an energy source for wireless mobile devices. Further, as alternative plans to solve problems of air pollution and greenhouse house with the existing internal combustion engine vehicles using fossil fuels such as a gasoline vehicle and a diesel vehicle, a hybrid electric vehicle (HEV), a plug-in hybrid electric vehicle (PHEV), a battery electric vehicle (BEV), or the like have been proposed. The lithium secondary battery has been drawn as a power source for the alternative vehicles to the internal combustion engine vehicles.

The lithium secondary battery is classified into a lithium ion battery using a liquid electrolyte and a lithium polymer battery using a polymer electrolyte depending on a type of electrolytic solutions, and is classified into cylindrical, prismatic, and a pouch types depending on a types of an exterior material in which an electrode assembly is housed.

Among these, since the pouch type lithium secondary battery has an appearance that is made of a metal layer (foil) and a pouch film formed of multi-layers of a synthetic resin layer coated on upper and lower surfaces of the metal layer, the weight of the pouch type lithium secondary battery may be remarkably reduced than that of the cylindrical lithium secondary battery or the prismatic lithium secondary battery using a metallic can, such that the pouch type lithium secondary battery may be lightweight and may be changed to have various types.

However, since there is a limitation on a forming depth of the pouch film in a structural aspect thereof, in order to achieve the secondary battery having a thickness of 6 mm or more, the formed pouch should be adhered by folding.

Korean Patent Laid-Open Publication No. 10-2013-0089614 discloses an exterior material forming composition for a secondary battery which includes carbon fibers, ceramics and a solvent, and an exterior material formed by including the same, however, did not suggest an alternative idea to solve the above-described problems.

SUMMARY OF THE INVENTION

Accordingly, it is an object of the present invention to provide a lithium secondary battery which may achieve a high-capacity without limitation on a battery thickness to have a high energy density.

In addition, another object of the present invention is to provide a lithium secondary battery having excellent resistance to permeability and long-term durability.

Further, another object of the present invention is to provide a lithium secondary battery sub module having a high energy density with a compact shape, and reduced manufacturing costs.

In order to accomplish the above objects, according to an aspect of the present invention, there is provided a lithium secondary battery including: an electrode assembly; a plastic case which houses the electrode assembly and includes a gas barrier layer; and a pouch film cover which seals the plastic case having the electrode assembly housed therein.

In an embodiment of the lithium secondary battery of the present invention, the plastic case may be made of at least one selected from a group consisting of polyethylene, polypropylene, polyethylene terephthalate and polyethylene naphthalate.

In an embodiment of the lithium secondary battery of the present invention, the plastic case may be injection mold.

In an embodiment of the lithium secondary battery of the present invention, the gas barrier layer may include at least one selected from a group consisting of ethylene-vinyl alcohol copolymer; polyvinylidene chloride; polyvinyl alcohol; nylon; polyamide; polyacrylonitrile, linear low-density polyethylene, ethylene-vinyl alcohol copolymer, and ionomer copolymer; a metal film; a coating layer made of at least one selected from a group consisting of silica, alumina, rubber, metal, glass and amorphous carbon; and a film having a coating layer in which layered silicate nano particles are dispersed in a polyvinyl alcohol binder.

In an embodiment of the lithium secondary battery of the present invention, the gas barrier layer may be formed on an inner surface of the plastic case.

In an embodiment of the lithium secondary battery of the present invention, the plastic case may be foiled in a plurality of layers, and the gas barrier layer is included in an inner layer of the plastic case.

In an embodiment of the lithium secondary battery of the present invention, the pouch film cover may be a stacked film including an inner resin layer, a metal thin film and an outer resin layer.

In an embodiment of the lithium secondary battery of the present invention, the inner resin layer contacting with the plastic case of the pouch film cover may be made of the same material as the plastic case.

According to an aspect of the present invention, there is provided a lithium secondary battery sub module including: a heat radiation plate; and the lithium secondary batteries according to the present invention, which are respectively disposed on both side of the heat radiation plate, wherein the respective lithium secondary batteries are disposed so that the pouch film covers face the heat radiation plate.

The lithium secondary battery of the present invention may achieve a battery having a significantly increased thickness to increase the capacity thereof without structural limitation, thereby having a higher energy density than the conventional lithium secondary battery.

The lithium secondary battery of the present invention has excellent resistance to permeability, such that it is possible to secure durability of the battery.

The lithium secondary battery of the present invention is made without a pouch forming process, such that it is possible to improve productivity due to a decrease in an occurrence of poor insulation.

Further, the lithium secondary battery sub module of the present invention may have a high energy density and may be formed in a compact shape, thus having economic advantages due to the reduction of manufacturing costs.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE INVENTION

The present invention discloses a lithium secondary battery including: an electrode assembly; a plastic case which houses the electrode assembly and includes a gas barrier layer; and a pouch film cover which seals the plastic case having the electrode assembly housed therein, such that it is possible to achieve a battery having a significantly increased thickness so as to increase the capacity thereof without structural limitation, secure durability of the battery due to having excellent resistance to permeability, and improve productivity due to a decrease in an occurrence of poor insulation. Thereby, the lithium secondary battery sub module including the lithium secondary battery may have a high energy density and may be formed in a compact shape with reduced manufacturing costs.

Figure 2:
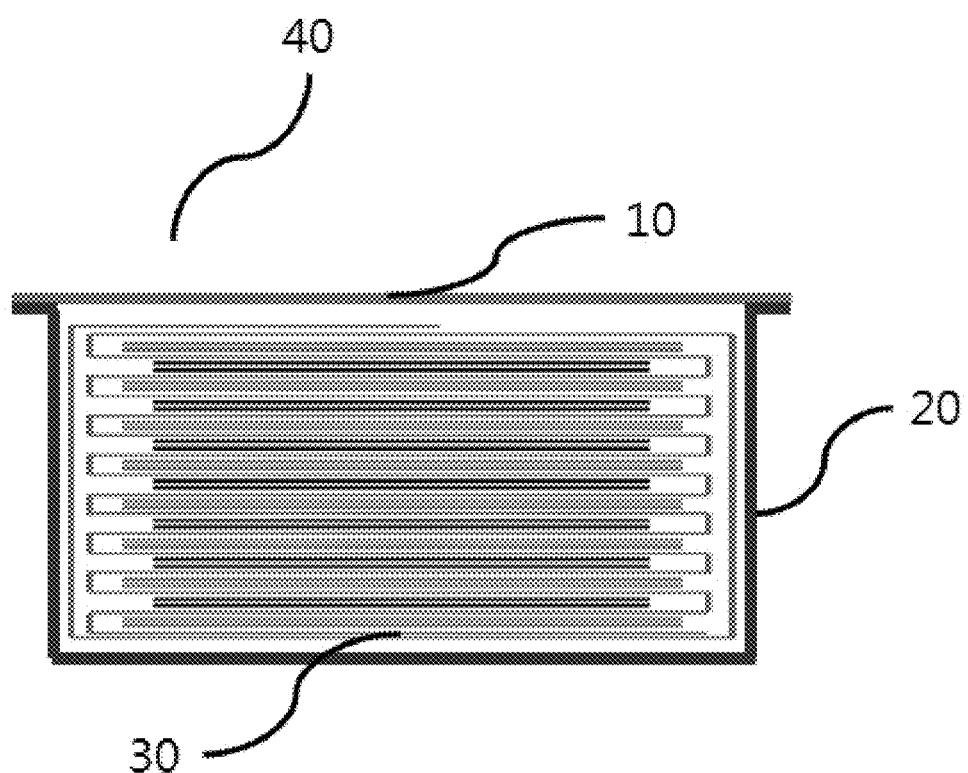
FIG. 2 is a cross-sectional view schematically illustrating a structure of a lithium secondary battery according to an embodiment of the present invention.
Figure 3:
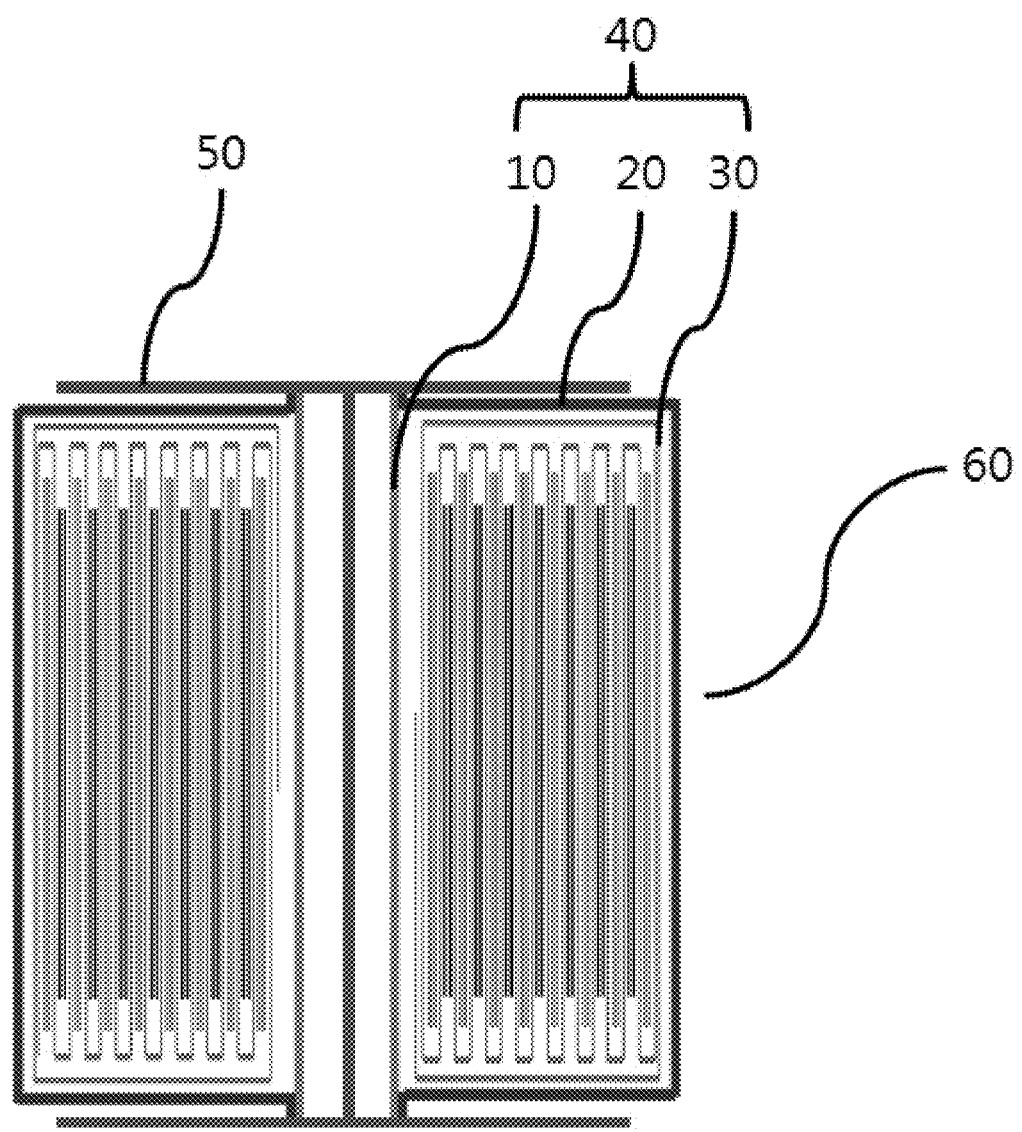
FIG. 3 is a cross-sectional view schematically illustrating a lithium secondary battery sub module according to an embodiment of the present invention.

FIG. 2 illustrates a lithium secondary battery according to an embodiment of the present invention, and FIG. 3 illustrates a lithium secondary battery sub module according to an embodiment of the present invention.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

Lithium Secondary Battery 40

Pouch Film Cover 10

The lithium secondary battery 40 of the present invention includes an electrode assembly 30, a plastic case 20 in which the electrode assembly 30 is contained, and a pouch film cover 10 which seals the plastic case 20 having the electrode assembly 30 housed therein.

Materials for forming the pouch film cover 10 may be any material generally used for the pouch film in the related art, and types thereof are not particularly limited within a range not departing from the purpose of the present invention.

In particular, the pouch film cover 10 may be formed in a multi-layer structure including, for example, an inner resin layer which plays a role of a sealing material due to having sequential thermal adhesiveness, and is made of polyethylene, polyolefin such as non-stretched polypropylene or polypropylene, etc., or an adhesive layer made of a copolymer thereof; a metal thin film which plays a role of a base film for maintaining a mechanical strength and a barrier layer against moisture and oxygen; and an outer resin layer which functions to protect battery cells from an external impact applied thereto, and is a functional polymer layer such as polyethylene terephthalate and polyethylene naphthalate, nylon, or a liquid crystal polymer resin, etc.

The above-described inner resin layer, metal thin film and outer resin layer may be formed in a plurality of layers of two layers or more, respectively, and any configuration known in the related art other than the above-described layers may be applied to the pouch film cover 10 of the present invention, without particular limitation thereof.

Sealing between the pouch film cover 10 and the plastic case 20 may be performed by thermal fusion bonding in consideration of characteristics of the used material, but it is not particularly limited thereto so long as it is within a range without departing from the purpose of the present invention.

Meanwhile, the inner resin layer contacting with the plastic case 20 for increasing sealing properties therebetween may be made of the same material as the plastic case 20.

Plastic Case 20

The plastic case 20 houses the electrode assembly 30 in an inner space of the lithium secondary battery 40 of the present invention, and includes a gas barrier layer.

Figure 1:
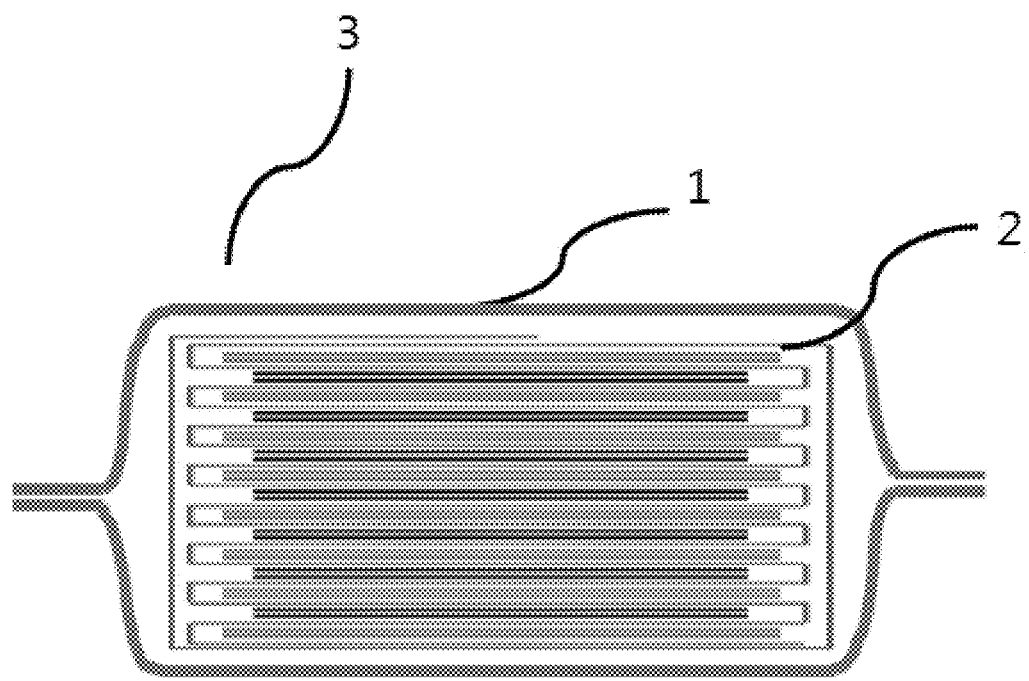
FIG. 1 is a cross-sectional view schematically illustrating a structure of a conventional pouch type secondary battery.

As illustrated in FIG. 1, a conventional pouch type secondary battery 3 is manufactured by a method including the processes of inserting an electrode assembly 2 into a space formed by pouch film covers 1, injecting electrolyte therein and sealing the pouch film covers 1. However, when the battery has a thickness of 6 mm or more, cracks occur in the pouch due to a limitation on a forming depth of the pouch film in a structural aspect thereof. Accordingly, in order to solve this problem, the secondary battery 3 is manufactured by a method of adhering the formed pouch film covers 1 so as to face each other, however there is a structural limitation for increasing a capacity of the battery in unit cells due to the limitation on the forming depth of the pouch film.

Therefore, in the present invention, a space capable of containing the electrode assembly 30 is formed by the plastic case 20 including the gas barrier layer, and the electrode assembly 30 is housed in the space, and then the space is covered with the pouch film cover 10 and is sealed by the thermal fusion bonding. Thereby, since there is no actual limitation on a form to be formed in an aspect of characteristics of the plastic material, it is possible to achieve a secondary battery with no limitation on the thickness thereof. Accordingly, it is possible to achieve a high-capacity secondary battery that could not be achieved by the conventional secondary battery, such that the energy density of the lithium secondary battery may be increased.

Meanwhile, since most plastic materials are permeable, when using the plastic material as an exterior material of the battery, there may be a problem entailed in long-term durability. Therefore, the lithium secondary battery 40 of the present invention is configured in such a way that the plastic case 20 includes the gas barrier layer, and thereby resistance to permeability may be secured, and an inlet and outlet of a gas between an inside and outside of the battery may be prevented so as to provide long-term durability.

In addition, since the secondary battery of the present invention is manufactured without a process of forming the pouch as in the related art, it is possible to improved productivity upon manufacturing due to a decrease in an occurrence of poor insulation.

Types of the material for forming the plastic case 20 according to the present invention are not particularly limited, but as a particular example, may include at least one selected from a group consisting of polyethylene, polypropylene, polyethylene terephthalate and polyethylene naphthalate, which are preferable in terms of securing the molding workability, sealing properties and insulation properties.

In the present invention, it is possible to achieve a battery having a large thickness by adjusting a shape of the plastic case 20 according to the present invention. In this regard, a processing method of the plastic case 20 is not particularly limited, but an injection molding method is preferably used in an aspect of the form of a battery case.

The gas barrier layer according to the present invention is not particularly limited, but as a particular example, may include at least one selected from a group consisting of ethylene-vinyl alcohol copolymer; polyvinylidene chloride; polyvinyl alcohol; nylon; polyamide; polyacrylonitrile, linear low-density polyethylene, ethylene-vinyl alcohol copolymer, and ionomer copolymer; a metal film; a coating layer made of at least one selected from a group consisting of silica, alumina, rubber, metal, glass and amorphous carbon; and a film having a coating layer in which layered silicate nano particles are dispersed in a polyvinyl alcohol binder, which are preferable in terms of securing the workability and resistance to permeability.

In one embodiment of the present invention, the gas barrier layer is formed on an inner surface of the plastic case 20, and may be located so as to contact with the electrode assembly 30 housed inside the plastic case 20.

In another embodiment of the present invention, when the plastic case 20 has a multi-layer structure including one or more plastic layers on upper and lower portions of the gas barrier layer, respectively, the gas barrier layer is included as an inner layer of the plastic case 20. More particularly, when the material of the plastic case 20 is polypropylene, it may be a multi-layer structure of polypropylene/gas barrier layer/polypropylene which are sequentially stacked in this order.

Electrode Assembly 30

The electrode assembly 30 included in the lithium secondary battery 40 of the present invention is known in the related art, and may have any shape so long as it is within a range not departing from the purpose of the present invention. As a particular example, it may have the same shape as the electrode assembly 30 to be described below, but it is not limited thereto.

According to one embodiment of the present invention, the electrode assembly 30 may have a shape in which a cathode plate, a separator, and an anode plate are disposed in this order to be wound in one direction, or a plurality of cathode plates, separators, and anode plates are stacked. Each of the cathode and anode plates may be electrically connected with a cathode tap and an anode tap, and in the cathode and anode plates, one end portion of the respective cathode and anode taps may protrude to an outside through a lead. The one end portion of the protruded lead may be connected with an external terminal (not illustrated). Outer surfaces of the leads may be wound by an electrode tape, respectively, in order to prevent an electrical short circuit between a body and cover of the case and the leads at a portion contacting with an outer portion.

The lithium secondary battery 40 according to the present invention may be applied to medium and large size battery modules or battery packs to be used as a unit cell. The medium and large size battery modules or battery packs may be used as a power source for medium and large size devices such as one or more of an electric vehicle (EV) including a hybrid electric vehicle (HEV), a plug-in hybrid electric vehicle (PHEV); an electric truck; an electric bus & truck; and an energy storage system.

The medium and large size battery modules are configured in such a way that a plurality of unit cells are connected with each other in a series manner or series/parallel manner to provide a high capacity, which are known in the related art, and therefore will not described in detail in the present disclosure.

Lithium Secondary Battery Sub Module 60

The present invention also provides the lithium secondary battery sub module 60 which includes the lithium secondary batteries 40 of the present invention disposed on both sides of a heat radiation plate 50, wherein the lithium secondary batteries 40 are disposed so that the pouch film covers 10 face the heat radiation plate 50.

The lithium secondary battery sub module 60 of the present invention includes the heat radiation plate 50 between the unit lithium secondary batteries 40 so as to absorb and radiate heat generated inside the battery to the outside. The heat radiation plate 50 may be made of aluminum, copper, or the like, but it is not particularly limited thereto.

The above-described lithium secondary batteries 40 of the present invention are disposed on both sides of the heat radiation plate 50. In this case, as described above, the lithium secondary batteries 40 are disposed so that the pouch film covers 10 face the heat radiation plate 50.

The conventional secondary battery sub module using the pouch type unit lithium secondary battery needs a separate cell cover for protecting the pouch type secondary battery on the outside of the module. However, the lithium secondary battery sub module according to the present invention does not need a separate cell cover, because the plastic cases 20 are disposed on the outside of the module.

Accordingly, the lithium secondary battery sub module 60 of the present invention has a higher energy density than the conventional secondary battery sub module including the lithium secondary battery, as well as may achieve a compact shape due to excluding a separate cell cover or panel part by a stiffness of the plastic case 20, and thereby has economic advantages due to the reduction of manufacturing costs.

DESCRIPTION OF REFERENCE NUMERALS

1, 10: pouch film cover
20: plastic case
2, 30: electrode assembly
3, 40: lithium secondary battery
50: heat radiation plate
60: lithium secondary battery sub module

What is claimed is:

1. A lithium secondary battery sub module comprising:
   a plurality of lithium secondary batteries; and
   a heat radiation plate including a vertical portion disposed between two adjacent lithium secondary batteries of the plurality of lithium secondary battery,
   wherein each of the plurality of lithium secondary batteries includes:
   an electrode assembly;
   a plastic case which is an injection molded product and housing the electrode assembly;
   a gas barrier layer formed on an inner surface of the plastic case; and
   a cover having a film form which seals the plastic case, the cover comprises an inner resin layer facing to the electrode assembly, an outer resin layer facing to the vertical portion of the heat radiation plate, and a metal thin film disposed between the inner resin layer and the outer resin layer, wherein the outer resin layer formed from at least one selected from a group consisting of polyethylene terephthalate, polyethylene naphthalate, nylon and a liquid crystal polymer resin, wherein the covers of the two adjacent lithium secondary batteries face to the vertical portion of the heat radiation plate, and the covers and the vertical portion are physically spaced apart from each other, wherein the heat radiation plate further includes:

a first horizontal portion extending from an end of the vertical portion; and a second horizontal portion extending from another end of the vertical portion, wherein the two adjacent lithium secondary batteries are positioned between the first and second horizontal portion.

2. The lithium secondary battery sub module according to claim 1, wherein the plastic case includes at least one selected from a group consisting of polyethylene, polypropylene, polyethylene terephthalate and polyethylene naphthalate.

3. The lithium secondary battery sub module according to claim 1, wherein the gas barrier layer includes at least one selected from a group consisting of ethylene-vinyl alcohol copolymer, polyvinylidene chloride, polyvinyl alcohol, nylon, polyamide, polyacrylonitrile, linear low density polyethylene, an ethylene-vinyl alcohol copolymer, an ionomer copolymer, a metal film and a coating layer formed of at least one selected from a group consisting of silica, alumina, rubber, a metal, glass and amorphous carbon.

4. The lithium secondary battery sub module according to claim 1, wherein the gas barrier layer includes a coating layer in which layered silicate nano particles are dispersed in a polyvinyl alcohol binder.

5. The lithium secondary battery sub module according to claim 1, wherein each of the lithium secondary batteries further includes a plastic layer formed on an inner surface of the gas barrier layer.

* * * * *